(12) United States Patent
Geerits et al.

(10) Patent No.: US 8,125,848 B2
(45) Date of Patent: Feb. 28, 2012

(54) ACOUSTIC LOGGING-WHILE-DRILLING TOOLS HAVING A HEXAPOLE SOURCE CONFIGURATION AND ASSOCIATED LOGGING METHODS

(75) Inventors: Theodorus W. Geerits, Houston, TX (US); Batakrishna Mandal, Missouri City, TX (US); Denis P. Schmitt, Katy, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 1137 days.

(21) Appl. No.: 11/062,395

(22) Filed: Feb. 22, 2005

(65) Prior Publication Data

US 2006/0198242 A1    Sep. 7, 2006

(51) Int. Cl.
*G01V 1/00* (2006.01)
(52) U.S. Cl. .............. 367/50; 367/25; 367/26; 367/31; 367/32; 367/911; 181/102; 181/103; 181/104
(58) Field of Classification Search .............. 367/25, 367/26, 31, 32, 911, 912; 181/102–104
See application file for complete search history.

(56) References Cited

U.S. PATENT DOCUMENTS

| | | | |
|---|---|---|---|
| 4,832,148 A * | 5/1989 | Becker et al. | 181/104 |
| 4,855,963 A | 8/1989 | Winbow et al. | |
| 4,932,003 A | 6/1990 | Winbow et al. | |
| RE33,472 E | 12/1990 | Chung | |
| 5,027,331 A | 6/1991 | Winbow et al. | |
| 5,309,404 A * | 5/1994 | Kostek et al. | 367/31 |
| 5,753,812 A | 5/1998 | Aron et al. | |
| 5,886,303 A * | 3/1999 | Rodney | 181/102 |
| 6,023,443 A * | 2/2000 | Dubinsky et al. | 367/76 |
| 6,366,531 B1 * | 4/2002 | Varsamis et al. | 367/26 |
| 6,474,439 B1 * | 11/2002 | Hoyle et al. | 181/102 |
| 6,552,962 B1 | 4/2003 | Vasramis et al. | |
| 6,568,486 B1 | 5/2003 | George | |
| 6,631,327 B2 | 10/2003 | Hsu et al. | |
| 2002/0113717 A1 * | 8/2002 | Tang et al. | 340/854.4 |

OTHER PUBLICATIONS

Sinha, et al. "Higher-order modes in a fluid-filled borehole." 1998 IEEE Ultrasonics Symposium.*

* cited by examiner

*Primary Examiner* — Jack Keith
(74) *Attorney, Agent, or Firm* — Krueger Iselin LLP

(57) ABSTRACT

Multipole acoustic logging-while-drilling (LWD) tools and associated methods are disclosed herein. In some embodiments, the disclosed acoustic LWD tool comprises a transmitter array and at least one receiver array. The transmitter array generates acoustic waves with an excitation pattern having a cutoff frequency greater than about 3 kHz. The receiver array is spaced apart from the transmitter array and is configured to detect said acoustic waves. Some of the disclosed method embodiments comprise: generating multipole acoustic waves in a fluid-filled borehole using an excitation pattern with a cutoff frequency greater than about 3 kHz; selectively detecting acoustic waves that propagate with said excitation pattern; and determining an acoustic shear wave slowness for a formation penetrated by the borehole.

11 Claims, 5 Drawing Sheets

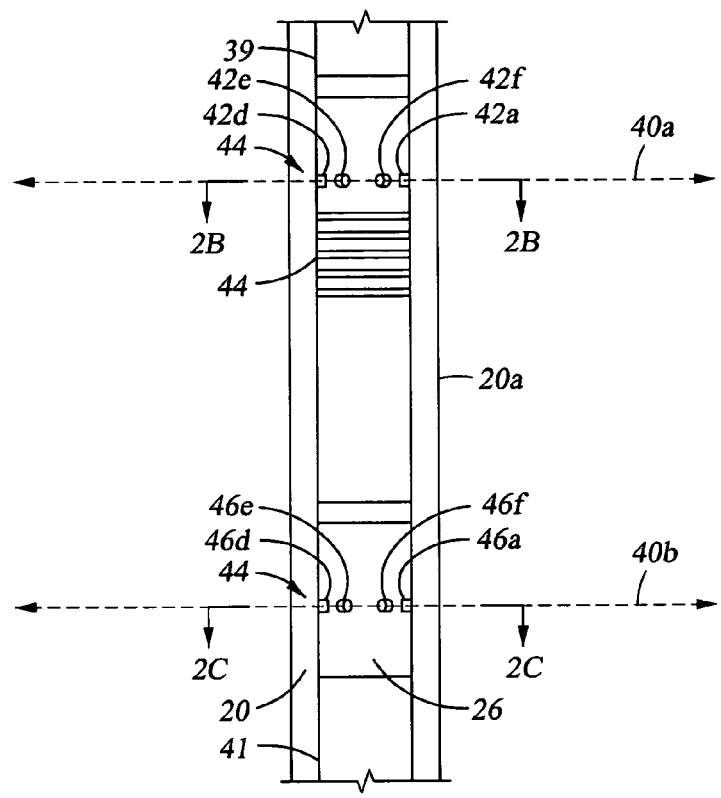
*Fig. 2A*
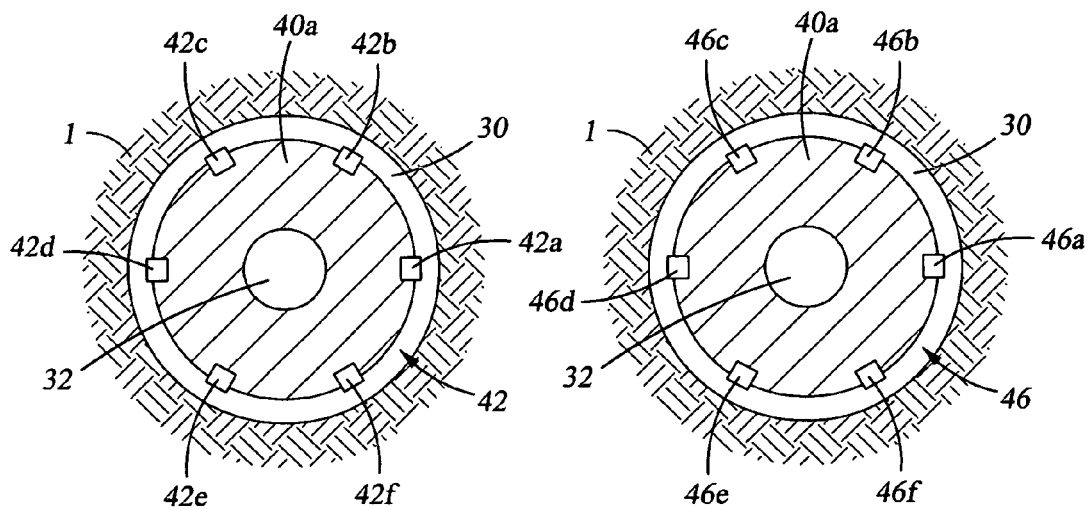
*Fig. 2B*  *Fig. 2C*

PROPERTIES:

FORMATION (1):
$S_p$ = 100 μS/FT
$S_s$ = 230 μS/FT
$D_{HOLE}$ = 8.5"
$\rho$ = 2.3 g/cc BOREHOLE FLUID:
$S_f$ = 190 μS/FT TOOL:
$S_p$ = 70 μS/FT
$S_s$ = 130 μS/FT
$D_{HOLE}$ = 7.25"
$\rho$ = 4.0 g/cc

ACOUSTIC LOGGING-WHILE-DRILLING TOOLS HAVING A HEXAPOLE SOURCE CONFIGURATION AND ASSOCIATED LOGGING METHODS

BACKGROUND

To obtain hydrocarbons such as oil and gas, boreholes are drilled by rotating a drill bit attached to a lower end of a drilling assembly. Due to the very high cost of drilling such boreholes and the need to minimize the amount of time spent drilling and collecting borehole information, it is commercially advantageous to gain as much information as possible during the drilling process. Information about downhole conditions and materials may be acquired using wireline tools or logging-while-drilling (LWD) tool assemblies. Wireline tools can only be used after a portion of the borehole has been drilled and the drilling assembly has been removed. In contrast, LWD tool assemblies are integrated into the drilling string and may, therefore, be used while the borehole is being drilled. Downhole information acquired from LWD tools may be more immediately available, and can be used to monitor and adjust the drilling direction of the borehole, to detect the presence of geologic formations and hydrocarbons, or for any other purpose which would benefit advantageously from near-contemporaneous borehole information.

In the search for hydrocarbons, many formation properties are measured and analyzed. One tool that has been employed for both wireline and LWD applications is the acoustic logging tool, which is used to measure propagation velocities of acoustic waves in the formation. Measurements of compressional and shear wave velocities in a subsurface earth formation are reflective of formation densities, composition, fractures, and fluid saturation. In addition, the acoustic velocity measurement logs can be combined with seismic survey information to obtain an accurate structural model of nearby formations.

However, while acoustic LWD techniques have proven very successful in measuring compressional wave velocities, such techniques have had mixed success in measuring shear wave velocities. More specifically, while acoustic LWD techniques can successfully measure shear wave velocities in "fast" subsurface earth formations in which the shear wave velocity is greater than the borehole fluid velocity, the results are much less satisfactory in "slow" subsurface earth formations in which the shear wave velocity is slower than the borehole fluid velocity.

In performing acoustic LWD in subsurface earth formations, monopole, dipole and quadrupole-type source excitations have been used. As monopole shear waves generated by monopole-type acoustic LWD tools cannot propagate along the borehole wall in slow formations, monopole-type acoustic LWD tools are poorly suited for measuring shear wave velocity in slow formations. Because of the need to measure shear wave velocity in slow formations, particularly in the soft sediments of deep-water reservoirs, dipole-type acoustic LWD tools were developed.

Unlike (refracted) monopole shear waves, dipole shear waves (also known as borehole flexural waves) generated by dipole-type acoustic LWD tools are borehole guided. If dipole shear waves are generated in a sufficiently low frequency range (typically from about 1 kHz to about 3 kHz), they will travel at the shear wave velocity of the subsurface earth formation regardless of whether the subsurface earth formation is a fast subsurface earth formation or a slow subsurface earth formation. Accordingly, dipole-type acoustic LWD tools would appear to be well suited for measuring the shear wave velocity of slow subsurface earth formations.

Unfortunately, however, in a LWD environment, the tool body must be rigid and hence relatively massive. Because of the massive tool body, dipole-type acoustic LWD tool measurements are often adversely affected by the waves in the tool body itself. More specifically, measurements of the dipole shear wave traveling along the borehole tend to be severely contaminated by the dipole wave energy traveling in the tool body (the "tool mode"). As a result, dipole-type acoustic LWD tools may be less than ideal for measuring shear wave velocity of slow subsurface earth formations.

The final source excitation technique is of the quadrupole-type and is employed in quadrupole-type acoustic LWD tools. However, the measurements of the quadrupole or screw mode induced by the quadrupole-type acoustic LWD tool tend to be adversely affected by drilling noise. Specifically, at relatively low frequencies (less than about 3 kHz) where the quadrupole mode propagates with the formation shear wave velocity, the drilling noise overshadows the low excitation amplitudes of the quadrupole mode, making direct formation shear wave velocity measurements very difficult.

Accordingly, there exists a need for an acoustic LWD tool and an associated logging method to overcome the shortcomings of prior acoustic LWD tools.

SUMMARY

The problems described above are addressed by multipole acoustic logging-while-drilling (LWD) tools and associated methods as disclosed herein. In some embodiments, the disclosed acoustic LWD tool comprises a transmitter array and at least one receiver array. The transmitter array generates acoustic waves with an excitation pattern having a cutoff frequency greater than about 3 kHz. The receiver array is spaced apart from the transmitter array and is configured to detect said acoustic waves. Some of the disclosed method embodiments comprise: generating multipole acoustic waves in a fluid-filled borehole using an excitation pattern with a cutoff frequency greater than about 3 kHz; selectively detecting acoustic waves that propagate with said excitation pattern; and determining a shear wave slowness for a formation penetrated by the borehole.

BRIEF DESCRIPTION OF THE DRAWINGS

A better understanding of the present disclosure can be obtained when the detailed description is considered in conjunction with the following drawings. It should be noted that the drawings are not drawn to scale, and are provided for explanatory purposes only.

FIGS. 2A-2C show an illustrative embodiment of an acoustic LWD tool having a hexapole source;

NOTATION AND NOMENCLATURE

Figure 1:
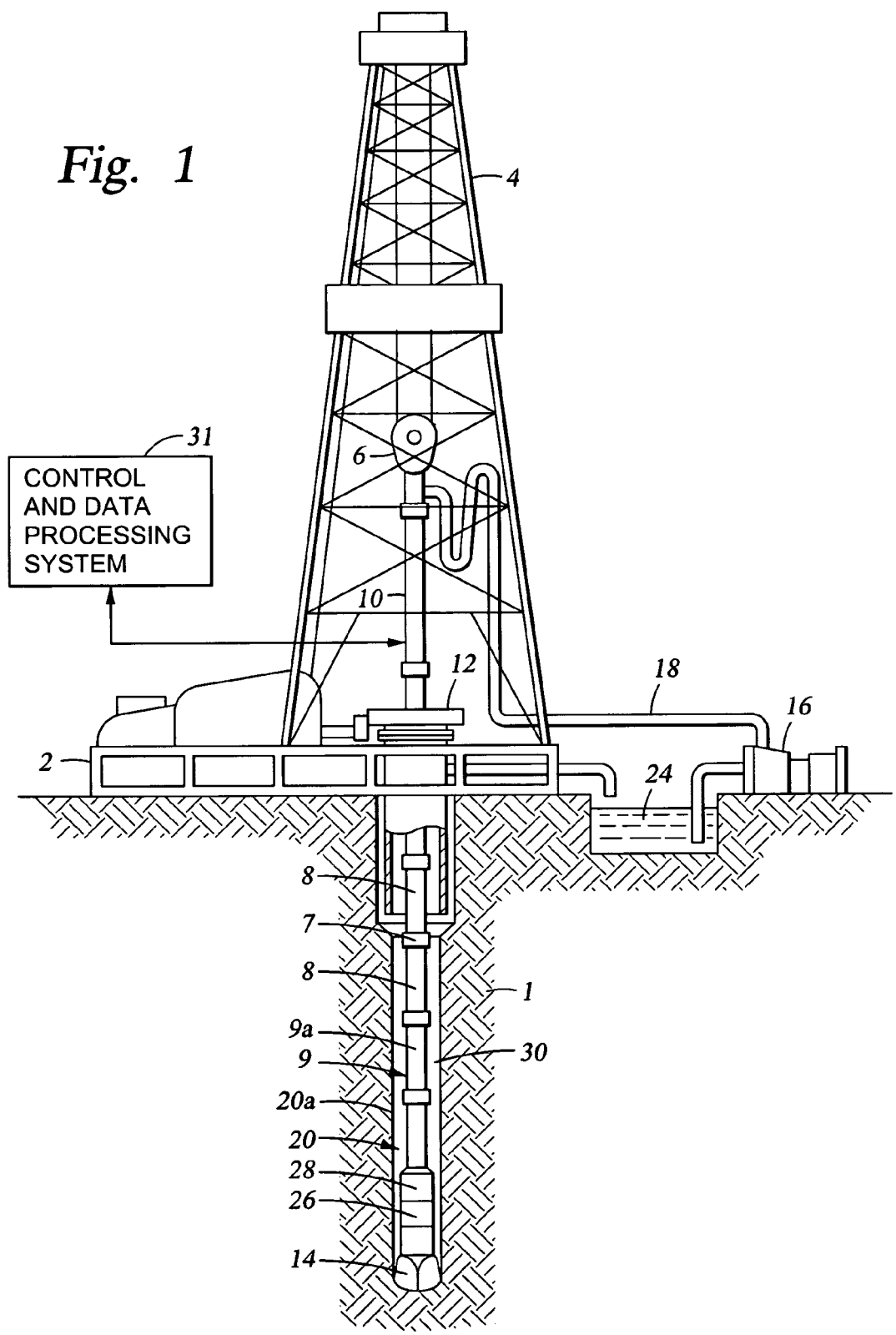
FIG. 1 shows an illustrative environment for employing a multipole acoustic logging-while-drilling ("LWD") tool.

Certain terms are used throughout the following description and claims to refer to particular system components. This document does not intend to distinguish between components that differ in name but not function.

The terms "including" and "comprising" are used in an open-ended fashion, and thus should be interpreted to mean "including, but not limited to . . . ".

The term "couple" or "couples" is intended to mean either an indirect or direct electrical, mechanical, or thermal connection. Thus, if a first device couples to a second device, that connection may be through a direct connection, or through an indirect connection via other devices and connections.

The term "modal cutoff frequency" generally refers to the frequency at and below which that wave mode travels at the formation shear wave slowness.

The term "multipole transmitter of order n" generally refers to a collection of 2n monopole sources (such as volume injection-type sources) periodically placed on a circle with an inter-azimuthal spacing of $\pi/n$ radians and alternating in sign.

The term "multipole receiver of order m" generally refers to a collection of 2m monopole receivers periodically placed on a circle with an inter-azimuthal spacing of $\pi/m$ radians. The monopole receivers may be pressure sensitive-type receivers.

DETAILED DESCRIPTION

It is contemplated that the present invention is susceptible to various modifications and alternative forms, specific embodiments of which are shown by way of example in the drawings and described in detail herein. Accordingly, it should be clearly understood that the drawings and detailed description set forth herein thereto are not intended to limit the invention to the particular form disclosed. On the contrary, the intention is to cover all modifications, equivalents and alternatives falling within the spirit and scope of the present invention as defined by the appended claims.

The following description relates to the design and use of an acoustic logging-while-drilling (LWD) tool having a hexapole source configuration. FIG. 1 shows an illustrative environment in which such an acoustic LWD tool 26 may be employed to acquire information regarding subsurface earth formations 1. The acquired information may relate to: (a) poroelastic properties of the formations; (b) anisotropic properties of the formations; or (c) shear slowness of the formations.

FIG. 1 shows a drilling platform 2 equipped with a derrick 4 that supports a hoist 6. Drilling of a borehole, for example, the borehole 20, is carried out by a string of drill pipes 8 connected together by "tool" joints 7 so as to form a drill string 9. The hoist 6 suspends a kelly 10 that is used to lower the drill string 9 through rotary table 12. Connected to a lower end of the drill string 9 is a drill bit 14. The drill bit 14 is rotated and the drilling of the borehole 20 is accomplished by rotating the drill string 9, by use of a downhole motor (not shown) located near the drill bit 14 or by a combination of the two. Drilling fluid, misleadingly referred to as "mud", is pumped, by mud recirculation equipment 16, through supply pipe 18, through drilling kelly 10 and down through interior passageway 32 of the drill string 9 (visible in FIGS. 2B and 2C). The mud exits the drill string 9 through apertures (not shown) in the drill bit 14. The mud then travels back up through the borehole 20 via an annulus 30 formed between an exterior side surface 9a of the drill string 9 and a wall 20a of the borehole 20, through a blowout preventer (not shown), and into a mud pit 24 located on the surface. On the surface, the drilling mud is cleaned and then returned into the borehole 20 by the mud recirculation equipment 16 where it is reused. Typically, the drilling mud is used to cool the drill bit 14, to carry cuttings from the base of the borehole 20 to the surface, and to balance the hydrostatic pressure in the subsurface earth formation 1 being explored.

The drill bit 14 is part of a bottom-hole assembly ("BHA") that includes one or more LWD tools 26 and a downhole controller/telemetry transmitter 28. Broadly speaking, each of the one or more downhole sensors 26 acquires information regarding the subsurface earth formation 1 being explored. While it is fully contemplated that the one or more downhole sensors 26 may include any number of different types of downhole tools or other devices designed to acquire different types of information regarding the subsurface earth formation 1, one such downhole sensor would be a hexapole-type acoustic LWD tool, also identified herein by reference numeral 26. Of course, the acoustic LWD tool 26, which will be more fully described below, can be any one of a family of multipole-type acoustic LWD tools.

As the acoustic LWD tool 26 acquires information regarding surrounding formations, the information may be processed and stored by the downhole controller/telemetry transmitter 28. Alternatively, or in addition, the information may be transmitted by the downhole controller/telemetry transmitter 28 to a telemetry receiver (not shown) at the surface. Downhole controller/telemetry transmitter 28 may employ any of various telemetry transmission techniques to communicate with the surface, including modulating the mud flow in the drill string 9, inducing acoustic vibrations in the drill string walls, and transmitting low-frequency electromagnetic waves. The telemetry receiver detects the transmitted signals and passes them to a control and data processing system 31 which, for ease of description, is shown in FIG. 1 as being schematically coupled to the drilling kelly 10. System 31 may record and/or process the received signals to derive information regarding the subsurface earth formations 1. In some embodiments, system 31 may be further configured to issue commands to acoustic LWD tool 26 to alter the operating parameters of the tool.

FIG. 2A shows an acoustic logging-while-drilling (LWD) tool 26 having a hexapole source configuration. Acoustic LWD tool 26 may be coupled between other tools 39 and 41 in the BHA. Acoustic LWD tool 26 includes an acoustic source array 42 and an acoustic receiver array 46, separated by an acoustic isolator 44. As will be more fully described below, the acoustic source array 42 is comprised of plural acoustic sources, spaced equidistant from one another around a peripheral edge of the hexapole-type acoustic LWD tool 26, located in a first plane generally orthogonal to the longitudinal dimension of the drill string 9. Similarly, the acoustic receiver array 46 is comprised of plural acoustic receivers, spaced around a peripheral edge of the hexapole-type acoustic LWD tool 26, located in a second plane generally orthogonal to the longitudinal dimension of the drill string 9. The acoustic isolator 44 serves to attenuate and delay acoustic waves that propagate, from the acoustic source array 42, through the body of the hexapole-type acoustic LWD tool 26, to the acoustic receiver array 46. As disclosed herein, it is contemplated that any acoustic isolator that can withstand the forces imposed by drilling operations may be suitable for use as the acoustic isolator 44. Preferably, the acoustic source array 42 and the acoustic receiver array 46 are formed of piezoelectric elements designed to operate in downhole conditions. However, it should be recognized that many other sources and detectors are suitable for use in downhole conditions and may, therefore, be used in place of the disclosed piezoelectric elements.

The hexapole-type acoustic LWD tool 26 preferably includes an internal controller (not shown) that communicates with the downhole controller 28. When the downhole controller 28 enables the operation of the hexapole-type acoustic LWD tool 26, the internal controller controls the triggering and timing of the acoustic sources forming the acoustic source array 42 and records and processes signals received from the acoustic receiver array 46. More specifically, the internal controller periodically fires the acoustic sources forming part of the acoustic source array 42, thereby producing acoustic pressure waves that propagate through the fluid in the borehole 20 and into the surrounding subsurface earth formation 1. At the borehole wall 20a defining the boundary between the borehole 20 and the surrounding subsurface earth formation 1, some of the acoustic energy is converted into shear waves that propagate along the interface between the borehole fluid and the subsurface earth formation 1. As these "interface waves" propagate past the acoustic receiver array 46, they cause pressure variations that can be detected by the piezoelectric elements forming respective ones of the acoustic receivers of the acoustic receiver array 46. Signals detected by the acoustic receiver array 46 may be processed by the internal controller to determine the true formation shear velocity. The internal controller may then communicate the formation shear velocity to the downhole controller/telemetry transmitter 28 for communication to the telemetry receiver/data processing system 31 located on the surface. Alternatively, the downhole controller/telemetry transmitter 28 may maintain a log of formation shear velocities downhole. The data log may be retrieved later, for example, upon removal of the downhole string 9 from the borehole 20.

FIGS. 2B and 2C shows first and second cross-sectional views of the hexapole-type acoustic LWD tool 26 taken along lines 2B-2B (the first plane generally orthogonal to the longitudinal dimension of the drill string 9) and 2C-2C (the second plane generally orthogonal to the longitudinal dimension of the drill string 9), respectively, of FIG. 2A. As may now be seen in FIG. 2B, the acoustic source array 42 includes first, second, third, fourth, fifth and sixth acoustic sources 42a, 42b, 42c, 42d, 42e and 42f, each located in the first plane, hereafter referred to as plane 40a, generally orthogonal to the longitudinal dimension of the drill string 9.

The acoustic sources 42a through 42f are equally spaced about the circumference of the tool 26, their centers being spaced about 60° apart. For example, the first acoustic source 42a is centered at about 0° along the peripheral edge of the hexapole-type acoustic LWD tool 26, the second acoustic source 42b is centered at about 60° along the peripheral edge of the hexapole-type acoustic LWD tool 26, the third acoustic source 42c is centered at about 120° along the peripheral edge of the hexapole-type acoustic LWD tool 26, the fourth acoustic source 42d is centered at about 180° along the peripheral edge of the hexapole-type acoustic LWD tool 26, the fifth acoustic source 42e is centered at about 240° along the peripheral edge of the hexapole-type acoustic LWD tool 26 and the sixth acoustic source 42f is centered at about 300° along the peripheral edge of the hexapole-type acoustic LWD tool 26. In some embodiments, the angular extent of the sources may be relatively small (<~5°), while in other embodiments, the sources may extend nearly 60° to abut with each other. Of course, intermediate angular extents are also contemplated.

Referring now to FIG. 2C, the acoustic receiver array 46 includes first, second, third, fourth, fifth and sixth acoustic receivers 46a, 46b, 46c, 46d, 46e and 46f, each located in the second plane, hereafter referred to as plane 40b, generally orthogonal to the longitudinal dimension of the drill string 9. The acoustic receivers 46a through 46f may be equally spaced, with their centers about 60 degrees apart. In any event, the acoustic receivers are each azimuthally aligned with (but longitudinally spaced apart from) a corresponding one of the acoustic sources 42a through 42f. For example, the first acoustic receiver 46a is centered at about 0° along the peripheral edge of the hexapole-type acoustic LWD tool 26 and is azimuthally aligned with the first acoustic source 42a, the second acoustic receiver 46b is centered at about 60° along the peripheral edge of the hexapole-type acoustic LWD tool 26 and is azimuthally aligned with the second acoustic source 42b, the third acoustic receiver 46c is centered at about 120° along the peripheral edge of the hexapole-type acoustic LWD tool 26 and is azimuthally aligned with the third acoustic source 42c, the fourth acoustic receiver 46d is centered at about 180° along the peripheral edge of the hexapole-type acoustic LWD tool 26 and is azimuthally aligned with the fourth acoustic source 42d, the fifth acoustic receiver 46e is centered at about 240° along the peripheral edge of the hexapole-type acoustic LWD tool 26 and is azimuthally aligned with the fifth acoustic source 42e and the sixth acoustic receiver 46f is centered at about 300° along the peripheral edge of the hexapole-type acoustic LWD tool 26 and is azimuthally aligned with the sixth acoustic source 42f. As with the sources, the angular extent of the receivers may vary.

Though not shown in this figure, tool 26 preferably includes multiple receiver arrays just like receiver array 46, but positioned at different axial distances from source array 42. The use of multiple receiver arrays allows for more accurate measurement of the velocity of waves propagating along the borehole. To improve measurement accuracy, semblance processing is often employed. The receiver arrays may be positioned between the source and the drill bit. This position advantageously reduces the drilling noise effects on the wave slowness measurements because the drill bit noise and the source signals are traveling in opposite directions, which causes their effects to appear at different positions in a semblance chart.

In some alternative embodiments of tool 26, the receiver array may omit one or more opposing receiver pairs from receiver array 46. For example, receivers 46b and 46e may be omitted to obtain a four-sensor receiver array 46. Note that the remaining receivers 46a, 46c, 46d and 46f are preferably still azimuthally aligned with corresponding acoustic sources 42a, 42c, 42d and 42f. As another example, receiver pair 46b, 46e, may be omitted along with receiver pair 46c, 46f, to obtain a two-sensor receiver array. The remaining receivers 46a, 46d will remain aligned with corresponding sources in the hexapole transmitter array. By such receiver pair omissions, the overall cost of the hexapole LWD tool 26 may be reduced at the expense of some potential loss of measurement quality when the tool is offset from the borehole axis or suffers some imbalance in the source characteristics.

Tool 26 includes an internal controller coupled to each of the acoustic sources and to each of the acoustic receivers. The internal controller fires the source array 46 by simultaneously applying a signal to each of the sources in the array. The internal controller may be configured to fire the source array in one of two ways to radiate acoustic wave energy in one of two excitation patterns: a monopole pattern (FIG. 3), and a hexapole pattern (FIG. 4).

Figure 3:
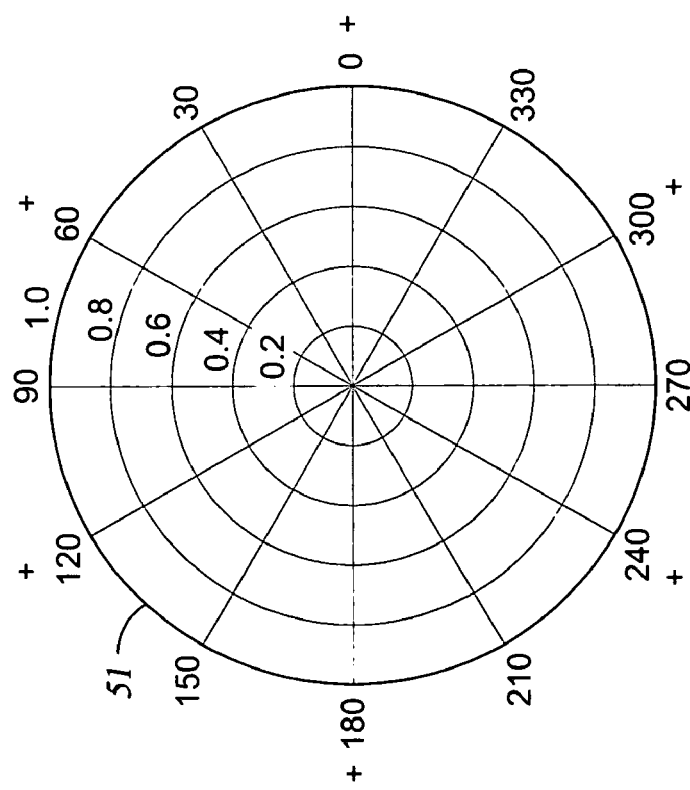
FIG. 3 shows an azimuthal radiation pattern for a monopole source.

FIG. 3 shows an ideal monopole pattern 51, in which energy is radiated equally in all azimuthal directions. (The pattern appears as a unit circle because radiation patterns are conventionally scaled to have a maximum of one.) The monopole pattern is traditionally generated by a single source. By simultaneously supplying a signal with the same polarity to each acoustic source, the internal controller can cause the source array 42 to emulate a single source. In practice, the true radiation pattern will have harmonics, i.e., it will be a sum of the monopole pattern with higher-order multipole patterns. However, the monopole pattern will be the dominant wave propagation mode (at least within the frequency range of interest, 2-10 kHz), and the signal processing can be designed based on an assumption of an ideal monopole pattern.

Figure 4:
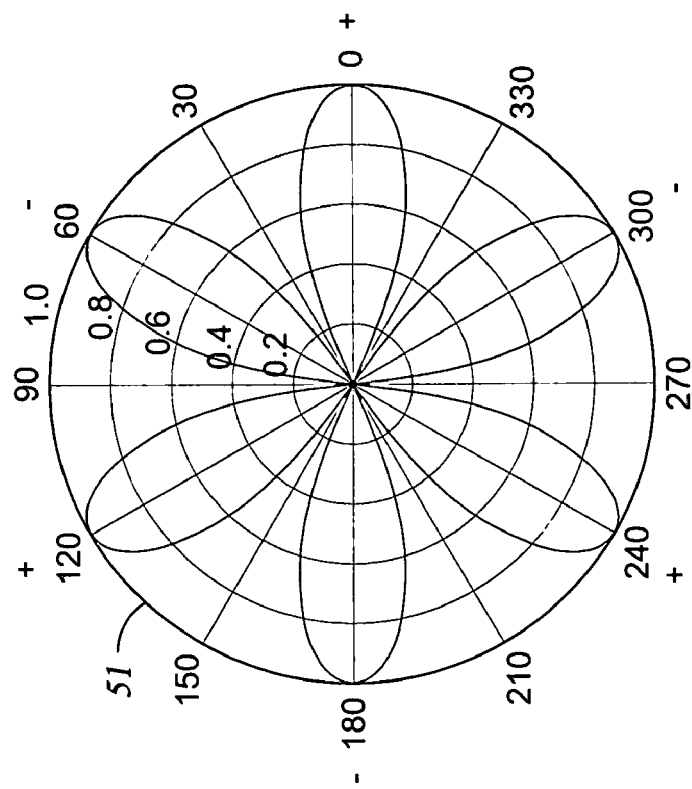
FIG. 4 shows an azimuthal radiation pattern for a hexapole source.

FIG. 4 shows an ideal hexapole pattern 45, in which energy is radiated in six equal (and equally-spaced) lobes. The internal controller causes the source array to radiate in a hexapole pattern by simultaneously supplying a signal to each acoustic source. However, unlike the monopole mode, in the hexapole mode, the internal controller provides the signal with alternate polarities to adjacent sources. Thus the signal supplied to acoustic sources 42a, 42c, and 42e, is inverted relative to the signals supplied to acoustic sources 42b, 42d, and 42f. As with the monopole mode, the radiation pattern in the hexapole mode may have harmonics, but the hexapole mode will be the dominant wave propagation mode, and the signal processing can be designed accordingly.

Though FIGS. 3 and 4 illustrate energy radiation patterns, they also serve to illustrate excitation modes to which the receiver array 46 is sensitive. In the monopole excitation the internal controller combines signals from all six acoustic sensors with the same polarity (i.e., R1+R2+R3+R4+R5+R6, where Ri represents the signal from sensor i. If sensor i is omitted, Ri=0.). Importantly, this array configuration makes the receiver array selectively sensitive to the acoustic waves propagating along the borehole in the monopole mode. Conversely, in the hexapole excitation the internal controller combines signals from all six acoustic sensors, giving signals from adjacent sensors alternate polarities (i.e., −R1+R2−R3+R4−R5+R6). This array configuration makes the receiver array selectively sensitive to the acoustic waves propagating along the borehole in the hexapole mode.

To determine the slowness of waves propagating in the monopole or hexapole patterns along the borehole, the internal controller appropriately combines signals from each receiver array as provided above, then processes the combined signals from the different receiver arrays to determine a time or phase semblance. High values of semblance correspond to wave energy propagating at the specified slowness. Low values of semblance correspond to an absence of any wave energy propagating at that slowness.

Time semblance E(t,s) may be determined as a function of time (t) and slowness (s) in accordance with the following equation:

$$E(t,s) = \frac{1}{N} \frac{\left(\sum_{i=1}^{N} x_i(t-sd_i)\right)^2}{\sum_{i=1}^{N} x_i^2(t-sd_i)}$$

where:

N is the number of receiver arrays;
$x_i(t)$ is the combined signal from the ith receiver array;
$d_i$ is the distance of the ith receiver array from the source array;
s is slowness; and
t is time.

Typically, semblance values E(t,s) range between zero and one. Values near one indicate a high correlation between the various recorded waveforms at the given time and slowness, and hence indicate the presence of a propagating wave having that slowness value. Values near zero indicate little correlation between the various waveforms at the given time and slowness value, and hence provide no indication of a propagating wave having that slowness value.

Phase semblance E(f,s) may be determined as a function of slowness (s) and frequency (f) in accordance with the following equation:

$$E(f,s) = \frac{1}{N} \frac{\left\| \sum_{i=1}^{N} \Phi[X_i(f) e^{-j(2\pi f) s d_i}] \right\|^2}{\sum_{i=1}^{N} \left\| \Phi[X_i(f) e^{-j(2\pi f) s d_i}] \right\|^2}$$

where:

N is the number of receiver arrays;
$x_i(t)$ is the combined signal from the ith receiver array;
$X_i(f)$ is the Fourier transform of combined signal $x_i(t)$,
$d_i$ is the distance of the ith receiver array from the source array;
s is slowness; and
$\Phi[c]$ is a phase operator that provides the phase a complex number c.

Figure 5:
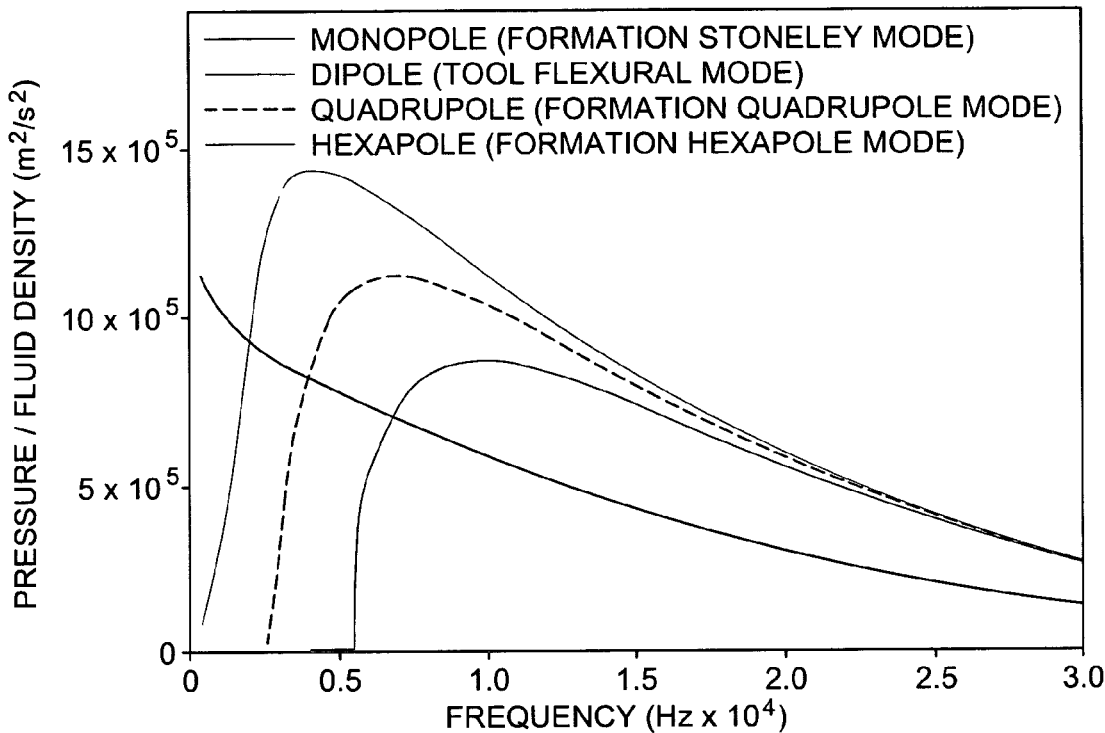
FIG. 5 shows the frequency dependence of excitation amplitude (pressure) and phase slowness for various source excitation regimes (monopole, dipole, quadrupole, hexapole) in a slow formation.
Figure 5:
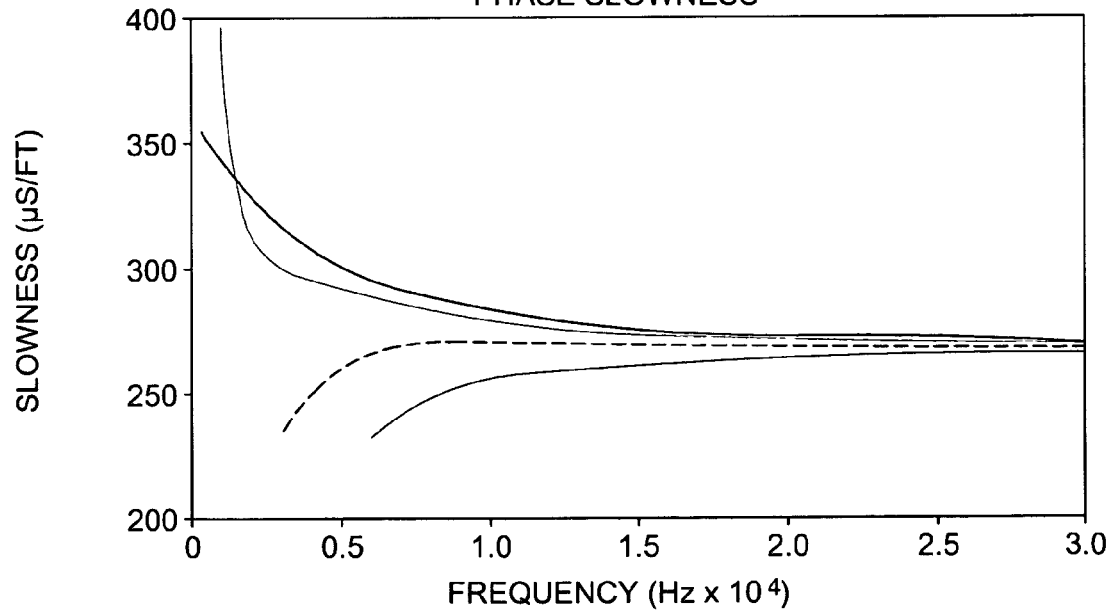

The effectiveness of an acoustic LWD tool having a hexapole source will now be explored. FIG. 5 shows an excitation amplitude and a phase slowness plot for each of four excitation regimes: monopole, dipole, quadrupole, and hexapole. For the monopole excitation regime the Stoneley mode excitation amplitude and phase slowness are shown. (The Stoneley mode is an important borehole-guided mode that dominates the monopole wavefield.) For the dipole excitation regime the tool flexural excitation amplitude and phase slowness are shown. (The tool flexural mode is the dominant mode when an LWD acoustic tool is fired in dipole mode, i.e., firing two opposing sources with opposite polarity.) The tool flexural mode is strongly coupled to the formation flexural mode at frequencies greater than 5 kHz and therefore is sensitive to formation changes in this frequency range. The formation flexural mode itself is rarely measured in the LWD environment. For the quadrupole excitation regime the formation quadrupole or screw mode excitation amplitude and phase slowness are shown. (The quadrupole mode is produced by firing four equally-spaced sources with alternating polarities.) For the hexapole excitation regime the formation hexapole excitation amplitude and phase slowness are shown. (The hexapole mode is produced by firing six equally-spaced sources with alternating polarities.) In modeling these configurations a typical LWD tool was incorporated. The formation, tool, and borehole fluid properties are indicated in the figure. ($S_p$ is the formation compressional wave slowness, $S_s$ is the formation shear wave slowness, D is the hole diameter, $\rho$ is the formation density, and $S_f$ is the acoustic wave slowness in the borehole fluid.)

The excitation function plots illustrate the frequency dependence of pressure as determined by simulation. (The plots have been normalized by dividing the pressure by the density of the drilling fluid, but they nevertheless illustrate the relative pressures at different frequencies.) The pressures shown are those that would be measured by a receiver that is azimuthally aligned with one of the transmitters and axially spaced from the transmitters by 4.5 feet.

The plots in FIG. 5 show that the excitation amplitudes of the various modes vary with frequency. Of particular interest is the "cutoff" frequency of the quadrupole and hexapole mode, i.e., the frequency at and below which these modes propagate with the formation shear slowness (230 µs/ft in the present example). It is clear from FIG. 5 that at these frequencies the excitation amplitudes are relatively low, but increases with increasing multipole order. Also clear from FIG. 5 is the fact that the cutoff frequency itself also increases with increasing multipole order (i.e., 2.8 kHz for the quadrupole mode and 6 kHz for the hexapole mode in this example). Consequently, in acoustic LWD there are two reasons for preferring a hexapole excitation over a quadrupole excitation:

The first reason is direct measurement of shear-wave slowness in a relatively low-noise frequency range. Recall that the shear wave slowness for the formation is 230 µs/ft. For most frequencies, the measured slowness is significantly greater than this value, so a slowness-correction must be applied to these measurements to obtain the true shear wave slowness. The only measured values that approach the true formation shear wave slowness are those values near the quadrupole and hexapole cutoff frequencies. However, excitation amplitudes near the cutoff frequency are small and may be difficult to measure due to noise contamination. This difficulty is particularly true for the quadrupole mode, which, for the simulated configuration, has a cutoff frequency in the drilling noise frequency range (0.1-3.0 kHz). Therefore, if possible, the acoustic LWD tool 26 should operate in a frequency range where drilling noise will not contaminate measurements. For a quadrupole tool, this would necessitate operating in a range where the slowness measurements deviate significantly from the true formation shear slowness. However, an acoustic LWD tool with a hexapole source would be able to operate in a frequency range where the hexapole mode slowness measurements approximate the true formation shear wave slowness.

The second reason for preferring a hexapole-type acoustic LWD tool over a quadrupole-type acoustic LWD tool follows from the observation that the hexapole mode shows a larger gradient in the excitation amplitude and a smaller gradient in the phase slowness dispersion curve than the quadrupole mode. This has the advantage that at frequencies slightly above the cutoff frequency the hexapole mode excitation amplitude is higher than the quadrupole excitation amplitude while, at the same time, the hexapole mode phase slowness is relatively closer to the true formation shear slowness than the quadrupole mode shear slowness.

It may be possible to operate in a higher order excitation regime, e.g., an octopole or decapole excitation. Such excitations are expected to yield even higher cutoff frequencies, allowing for slowness measurements approximating the true formation shear wave slowness at higher frequencies. A potential disadvantage to tools employing such excitations is the increased cost for additional transmitters and receivers. A potentially more serious disadvantage to such tools is the decreasing excitation amplitudes that may be expected for higher-order patterns and a decreased radial depth of investigation. With the reduced excitation amplitudes comes reduced signal amplitudes, making such measurements potentially unreliable. At this time, it is expected that a hexapole-type acoustic LWD tool may offer the most accurate measurements with the most reliable performance of any acoustic LWD tools.

Figure 6:
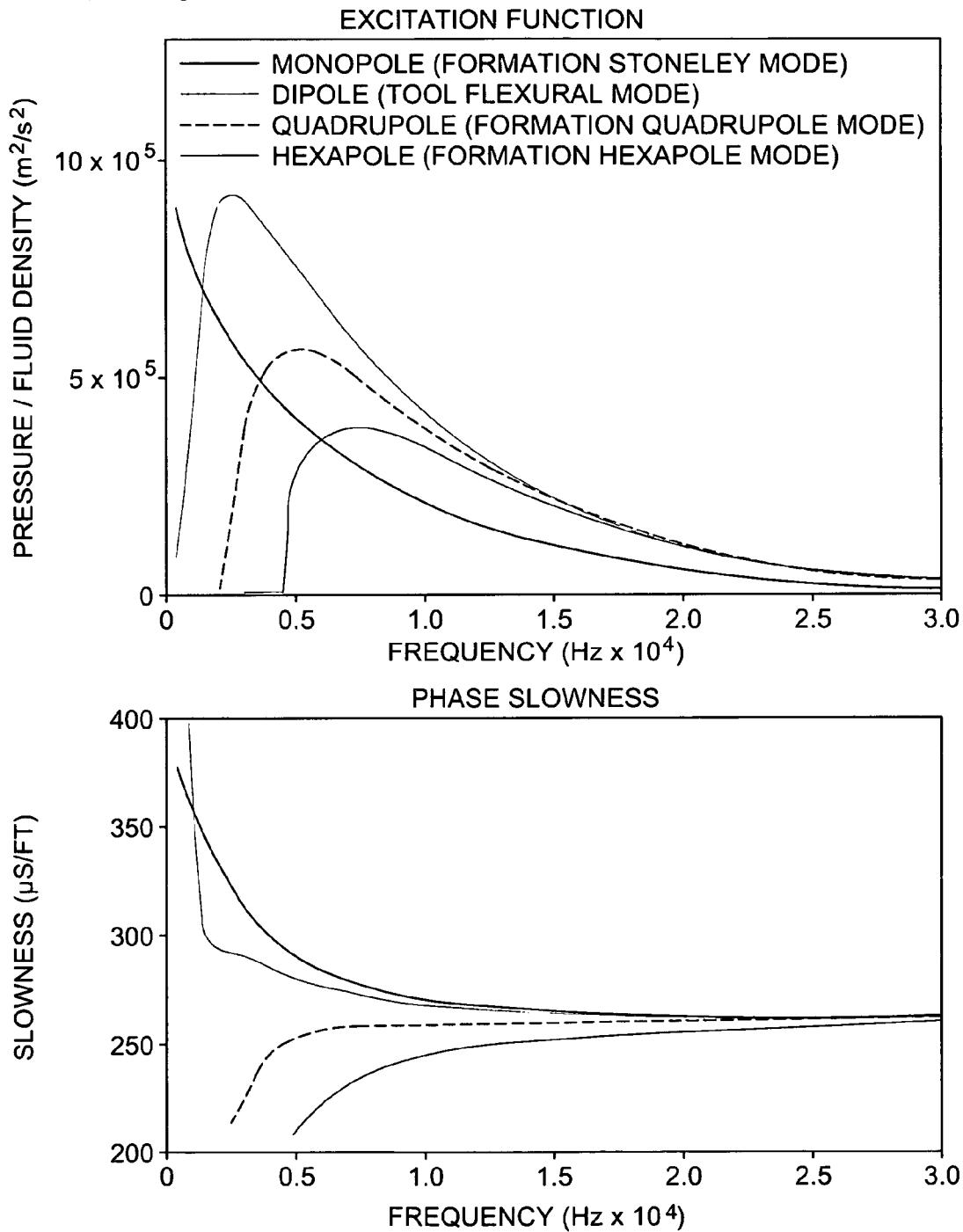
FIG. 6 shows the frequency dependence of excitation amplitude (pressure) and phase slowness for various source excitation regimes in a second slow formation having different properties than the formation of FIG. 5.

To confirm the results hereinabove described, a second simulation was performed, this time with a second slow subsurface earth formation having distinct characteristics relative to the first slow subsurface earth formation. More specifically, FIG. 6 shows an excitation amplitude and a phase slowness plot for each of the four excitation regimes discussed previously. The formation, tool, and borehole fluid properties are indicated in the figure.

As before, the plots in FIG. 6 show that the excitation amplitudes of the various modes vary with frequency. Of particular interest is the cutoff frequency of the quadrupole and hexapole mode, i.e., the frequency at and below which the these modes propagate with the formation shear slowness (305 µs/ft in the present example). The cutoff frequency again increases with increasing multipole order (i.e., 2.2 kHz for the quadrupole mode and 4.1 kHz for the hexapole mode in this example). Both reasons for preferring hexapole mode to quadrupole mode remain valid in the second example. The quadrupole's cutoff frequency is within the range of measurements that would be contaminated by drilling noise, whereas the hexapole's cutoff frequency is well outside this range. Accordingly, the hexapole-type acoustic LWD tool 26 may be expected to enjoy a substantial performance advantage over a similar tool with a quadrupole excitation pattern.

Thus, there has been described and illustrated herein multipole-type acoustic LWD tools and associated methods for obtaining shear slowness information for a subsurface earth formation. It should be clearly understood, however, that numerous variations and modifications of the methods and apparatus disclosed herein will become apparent to those skilled in the art once the above disclosure is fully appreciated. Accordingly, it is fully intended that the following claims be interpreted to embrace all such variations and modifications.

What is claimed is:

1. An acoustic logging-while-drilling (LWD) tool, comprising:
    a transmitter array that generates acoustic waves with an excitation pattern characterized by a formation cutoff frequency greater than about 3 kHz;
    at least one receiver array spaced apart from said transmitter array, wherein the receiver array includes acoustic sensors that each detect said acoustic waves; and
    a processor configured to combine signals from the acoustic sensors in the receiver array, wherein the number of acoustic sensors from which the processor is configured to combine signals is less than the number of transmitter poles in the transmitter array.

2. The tool of claim 1, wherein the excitation pattern is a multipole pattern having six or more lobes.

3. The tool of claim 1, wherein the at least one receiver array is one of a plurality of receiver arrays that are axially displaced from the transmitter array.

4. An acoustic logging-while-drilling (LWD) tool, comprising:
    a tool body having a generally cylindrical surface;
    an array of six acoustic sources, wherein the acoustic sources in the array are evenly-spaced azimuthally on the surface of the tool body;
    a plurality of receiver arrays axially spaced on the surface of the tool body from the source array; and
    a processor configured to combine acoustic sensor signals from each receiver array to detect hexapole acoustic waves, wherein the number of acoustic sensor signals combined from at least one of the receiver arrays is less than or equal to four.

5. The tool of claim 1, wherein the processor comprises an internal controller for the LWD tool.

6. The tool of claim 1, wherein the processor is part of a data processing system outside the borehole.

7. The tool of claim 4, wherein the plurality of receiver arrays is positioned between the array of acoustic sources and a source of drilling noise.

8. The tool of claim 4, further comprising an acoustic isolator positioned between the source array and the plurality of receiver arrays.

9. The tool of claim 4, wherein the number of acoustic sensor signals combined from said at least one of the receiver arrays is less than or equal to two.

10. The tool of claim 4, wherein the processor comprises an internal controller for the LWD tool.

11. The tool of claim 4, wherein the processor is part of a data processing system outside the borehole.

* * * * *